United States Patent
Joy et al.

(10) Patent No.: US 10,360,609 B2
(45) Date of Patent: Jul. 23, 2019

(54) INTER-DEVICE SELF-SERVICE TERMINAL (SST) INTERACTIONS

(71) Applicant: NCR Corporation, Duluth, GA (US)

(72) Inventors: Ian M. Joy, Scotland (GB); Rafael Torcida Fernández, Madrid (ES)

(73) Assignee: NCR Corporation, Atlanta, GA (US)

( * ) Notice: Subject to any disclaimer, the term of this patent is extended or adjusted under 35 U.S.C. 154(b) by 40 days.

(21) Appl. No.: 14/266,211

(22) Filed: Apr. 30, 2014

(65) Prior Publication Data

US 2015/0278895 A1  Oct. 1, 2015

(51) Int. Cl.
*G06Q 40/02* (2012.01)
*G06Q 30/06* (2012.01)
*G07G 1/01* (2006.01)
*G07G 1/14* (2006.01)
*G07F 19/00* (2006.01)
*G06Q 30/00* (2012.01)

(52) U.S. Cl.
CPC ....... *G06Q 30/0613* (2013.01); *G07F 19/211* (2013.01); *G07G 1/01* (2013.01); *G07G 1/14* (2013.01); *Y10S 902/39* (2013.01)

(58) Field of Classification Search
None
See application file for complete search history.

(56) References Cited

U.S. PATENT DOCUMENTS

| | | | | |
|---|---|---|---|---|
| 7,039,809 B1* | 5/2006 | Wankmueller | ....... | G06Q 20/401 705/72 |
| 2002/0148896 A1* | 10/2002 | Persky | ....... | G06Q 30/02 235/383 |
| 2002/0170782 A1* | 11/2002 | Millikan | ....... | A47F 9/048 186/61 |
| 2007/0145114 A1* | 6/2007 | Militello | ....... | G07F 19/20 235/379 |
| 2008/0061139 A1* | 3/2008 | Roquemore | ....... | G01G 19/4144 235/383 |
| 2008/0093441 A1* | 4/2008 | Taylor | ....... | G07F 19/20 235/379 |
| 2008/0097883 A1* | 4/2008 | Savage | ....... | G06Q 40/00 705/35 |
| 2009/0252057 A1* | 10/2009 | Flemming | ....... | H04W 8/30 370/254 |
| 2010/0318462 A1* | 12/2010 | Meek | ....... | G06Q 20/105 705/43 |
| 2011/0231331 A1* | 9/2011 | Smith | ....... | G06Q 30/0281 705/325 |
| 2011/0238763 A1* | 9/2011 | Shin | ....... | G06Q 10/10 709/206 |
| 2013/0041797 A1* | 2/2013 | Geeslin | ....... | G06Q 40/02 705/35 |

(Continued)

*Primary Examiner* — Scott A Zare
(74) *Attorney, Agent, or Firm* — Schwegman, Lundberg & Woessner (57) ABSTRACT

Methods and a system for inter-device Self-Service Terminal (SST) interactions are provided. A customer causes a request for assistance to be communicated from a SST during a transaction. A device in proximity to the SST accepts the request. A message is selected by a clerk of the device and relayed to the SST for presentation during the transaction. In an embodiment, the device wirelessly receives the request from a second device that is also in proximity to the SST.

9 Claims, 4 Drawing Sheets

(56) References Cited

U.S. PATENT DOCUMENTS

2014/0113556 A1\* 4/2014 Kotecha .............. H04W 76/023
 455/41.2
2015/0019357 A1\* 1/2015 Evfimiou ............. G06Q 20/203
 705/22

\* cited by examiner

INTER-DEVICE SELF-SERVICE TERMINAL (SST) INTERACTIONS

BACKGROUND

Consumers are embracing Self-Service (SS) technology. Enterprises have invested heavily in SS devices that permit consumers to perform a variety of transactions at a site (such as a retail store) of an enterprise. The investments have come for a variety of reasons, such as cost cutting to reduce onsite staff, reductions in expenses associated with adopting SS technology, increases in consumer throughput and overall experience while onsite, willingness of the consumer to embrace and use SS technology, and the like.

However, nothing frustrates a customer more and nothing can destroy customer loyalty more than poor enterprise service while at a site of an enterprise. In fact, the frustration is not exclusively tied to onsite service, as most consumers will attest to their displeasure with automated call centers where it can take an inordinate amount of time to speak with a real representative of an enterprise who fluently speaks the native tongue of the consumers.

So, although enterprises are integrating more and more SS options within their storefronts, the enterprises are increasing the risk that in-person service availability can substantially impair existing customer loyalty and sales. This risk is compounded by the fact that enterprises have reduced staff because of the availability of SS options and the staff that does remain is now being asked to multitask and perform a variety of functions for more foot traffic occurring at the enterprise storefronts.

Take for instance a bank branch where customers can enter to execute financial transactions with a bank, and where bank staff is made available to support those customers utilizing Automated Teller Machines (ATMs) when help is required while the same staff assists customers with in-person transactions. The bank staff cannot readily and efficiently assist the customers needing assistance at the ATMs while simultaneously assisting customers with in-person transactions. However, the ATM customers may become agitated and frustrated, since the ATM customers do not realize the staff is busy with someone else. Shouting across the bank by a staff member to an ATM customer is rude, and halting attention directed to an in-person customer who is currently at the counter with the staff member is also an inappropriate option.

SUMMARY

In various embodiments, methods and a system for inter-device Self-Service Terminal (SST) interactions are presented.

According to an embodiment, inter-device SST interaction is provided. Specifically, in an embodiment, a request for assistance, which is associated with a transaction session between the SST and a first device, is communicated. Next, a near real-time message is obtained, in response to the request, from a second device that is in physical proximity to the SST.

DETAILED DESCRIPTION

Figure 1:
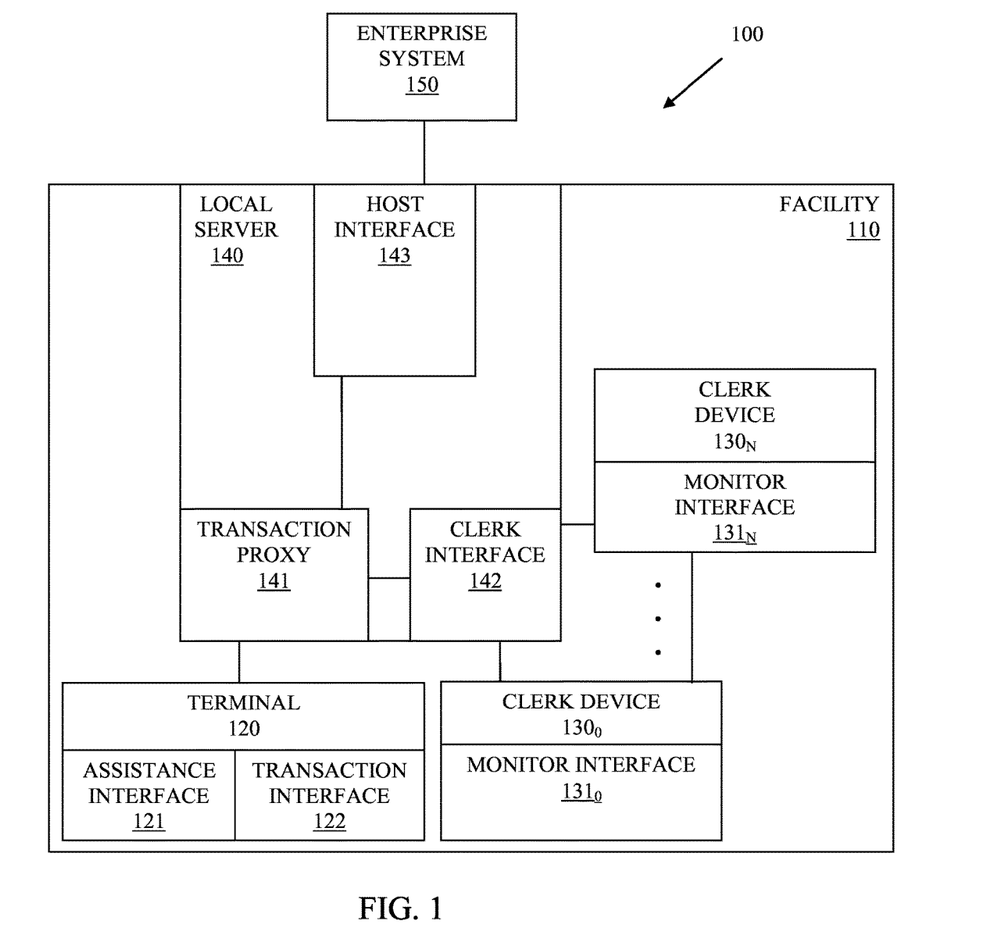
FIG. 1 is a diagram of an example architecture to enable inter-device Self-Service Terminal (SST) interactions, according to an example embodiment.

FIG. 1 is a diagram of an example architecture 100 to enable inter-device Self-Service Terminal (SST) interactions, according to an example embodiment. The various components are illustrated and the arrangement of the components is presented for purposes of illustration only. It is to be noted that other arrangements with more or less components are possible without departing from the onsite automated customer assistance teachings presented herein and below.

The techniques, methods, and system presented herein and below for inter-device SST interactions can be implemented in whole or in part in one, all, or some combination of the components shown with the architecture 100. The techniques and methods are programmed as executable instructions in memory and/or non-transitory computer-readable storage media and processed on one or more processors associated with the various components.

The discussion of the architecture 100 is within the context of a banking facility for banking transactions being made in person and at Automated Teller Machines (ATMs). It is noted that the architecture 100 is also applicable to any enterprise providing SSTs and in-person customer assistance. Thus, the description that follows below is but one embodiment of the invention and it not intended to limit the invention to only financial transactions at financial facilities.

The example architecture 100 includes a bank branch 110, an Automated Teller Machine (ATM) 120, a plurality of mobile tablets $130_0$-$130_N$, a branch server 140, and a financial system 150. The bank branch 110 includes the Automated Teller Machine (ATM) 120 operated by customers, the mobile tablets $130_0$-$130_N$ operated by tellers, and a branch server 140. The ATM 120 includes an assistance interface 121 and a transaction interface 122. Each tablet $130_0$-$130_N$ includes its own monitor interface $131_0$ and $131_N$, respectively. The bank server 140 includes a transaction proxy 141, a teller interface 142, and a financial system interface 143.

The bank branch 110 includes areas for customers to access the ATMs 120 to perform self-service financial transactions with a financial system 150 utilizing the transaction interface 122 of the ATM 120. The bank branch 110 also includes teller stations for customers to walkup and to perform in-person transactions with tellers. One or more of the tellers are equipped with the tablets $130_0$-$130_N$ (clerk device $130_0$-$130_N$ in the FIG. 1).

The ATMs 120 also include an assistance interface 121, which provides a mechanism for the customer to manually request assistance during a transaction at the ATM 120 and/or provides a mechanism for detecting when the customer may be in need of assistance during the transaction. The assistance interface 121 presents a screen on the display of the ATM 120 for which near-real time two-way communication can occur between the customer (who is performing the transaction) and one or more tellers operating one of the tablets $130_0$-$130_N$. The interactions of the two-way communication provided on the monitor interfaces $131_0$-$131_N$ of the tablets $130_0$-$130_N$.

An ATM 120 requires a great deal of security to protect both the consumer and a bank. As a result, the network accessibility to the ATM 120 is very restrictive. In fact, often the enterprise that services the ATM 120 has very limited network access to the ATM 120. One network connection that banks have found acceptable is a local bank server 140 that resides at the bank 110 and acts as a transaction proxy between the network connection of the ATM 120 and a financial backend system 150. It is noted that a customer at the bank branch 110 may utilize the bank's ATM 120 but conduct a financial transaction associated with a completely different bank, such that gateways are used to select the proper external financial system 150 that services the financial transaction. The local bank server 140 (for security reasons) may not see some details of the financial transaction, such as Personal Identification Numbers (PINs) which appear on the local server 140 as encrypted information. However, actions (transaction type, etc.) taken, customer information (customer name, etc.), transaction details (ATM number, etc.) are visible to local bank server 140.

During a transaction by a customer at the ATM 120 (while at the bank branch 110), the customer initiates the transaction (such as by swiping a bank card), which activates the transaction interface 122. A session is created with the external financial system 150 that passes through the transaction proxy 141 and the financial system interface 143. Some data (as discussed above) is decrypted or capable of being decrypted (based on security policies) by the transaction proxy 141. That visible data is provided to the teller interface 142.

The teller interface 142 has communication capabilities with the tablets $130_0$-$130_N$ within the bank branch 110. For example, the monitor interfaces $131_0$-$131_N$ can be used to authenticate each teller and each teller's tablet $130_0$-$130_N$ to the local bank server 140 and establish a wireless secure (encrypted protocols, such as Wired Equivalent Policy (WEP)) communication session with the teller interface 142 of the local bank server 140.

The teller interface 142 includes an Application Programming Interface (API) for automated two-way communication with the transaction proxy 141. In this manner, the tellers utilize the tablets $130_0$-$130_N$ having the monitor interfaces $131_0$-$131_N$ to create two-way real-time communication with customers at the ATMs 120 through the assistance interface 121 (which has its communications passed through the transaction proxy 141 (via an API) to the teller interface 142.

So, a teller can use the monitor interface $131_0$ to detect a customer in need of assistance at an ATM 120 while that teller is conducting an in-person transaction at the bank branch 110 at a teller station. The need for assistance pops up in a screen on the tablet $131_0$ and the teller interacts with the monitor interface $131_0$ to send a reply communication back to the ATM 120 via a screen on the ATM 120 that is responsive to the assistance interface 121. The screen of the assistance interface 121 occupies a location within the display of the ATM 120 so as to not interfere with the financial transaction of the customer at the ATM 120. The financial transaction associated with one or more other screens on the display of the ATM 120 and responsive to the transaction interface 122. In this manner, when the customer at the ATM 120 is in need of assistance and when the teller is preoccupied with another customer at the teller station and with just a slight distraction from the customer at the teller station, the teller can view the need for assistance on the tablet $130_0$, select a reply message and send it with just a few simple touches, such that the customer at the ATM 120 receives a near real-time response that assistance is forthcoming by the teller and why assistance is not immediate. This will reassure the customer at the ATM 120 that his/her request is going to be addressed and will mitigate any potential frustration that the customer might have had in wondering if the request was ever going to be addressed at all by the bank staff.

In an embodiment, the near real-time reply message that is received by the customer at the ATM 120 can be identified by the teller or dynamically supplied by the teller in a variety of manners. For example, the teller may have predefined a variety of messages, such that the teller simply taps a selection identifying a desired message and the monitor interface $131_0$ takes care of facilitating that selected message's delivery to a screen in near real time to the customer at the ATM 120. The teller is, perhaps, not even distracted at all from dealing with a customer present at the teller station and if a distraction does occur it is negligible and likely not even detectable by the customer at the teller station.

The message itself can be a variety of formats, such as but not limited to: prerecorded video, perhaps of the teller who sends the message; an animation having text, graphics, images, and/or audio; an audio message; and/or a text message.

The message can be prerecorded (as described above), such that selection of a particular message is a tap on screen of the tablet $130_0$. Alternatively, if the situation warrants, the message can be live and entered by the teller. For example, the teller may speak, briefly, into a microphone of the tablet $130_0$ and have it streamed through the bank server 140 directly to a speaker interfaced to or in the vicinity of the ATM 120 where a customer is conducting a transaction.

In an embodiment, the prerecorded messages that are available for selection by the teller reside on the tablet $130_0$. In another case, the prerecorded messages reside in memory or storage of the local bank server 140. In this latter embodiment, the teller uses the monitor interface $131_0$ to identify a prerecorded message and the teller interface 142 uses a selection (reference) from the monitor interface $131_0$ to locate the prerecorded message from memory and/or storage on the local bank server 140. In still another case, the prerecorded messages reside local on memory and/or storage accessible to the ATM 120 (although appropriate security policies are needed for this scenario), such that the reference to a particular recorded message is passed from the monitor interface $131_0$ to the teller interface 140, on to the transaction proxy 141, and delivered to the assistance interface 121. The assistance interface 121 uses the reference to locate the needed message and present to the customer of the ATM 120 in near real time and during the financial transaction. The last two embodiments (prerecorded messages residing on the local bank server 140 or the ATM 120) can be used for improving network response times from the time the teller identifies a message to the time the message is presented to the customer at the ATM 120 (reducing network bandwidth and transmission times by reducing the network traffic size associated with the prerecorded message).

The teller supplied or identified messages also can be personalized, such as providing the teller's name, tellers location relative to the ATM 120 within the bank branch 110, image or video of the actual teller, and the like. This is useful because the customer at the ATM 120 can view the message and make visual contact with the teller that will be assisting the customer. This may provide additional comfort to the customer at the ATM 120 in having even greater details associated with the customer's need for assistance.

Similarly, the request for assistance can be personalized for the teller. For example, an image or live video feed (via a camera interfaced to or in the vicinity of the ATM 120) of the customer at the ATM 120 can be provided on a screen of the tablet $130_O$ operated by the teller; or such personalized information can be available to the teller via a selection from the screen. Other details relevant to the request can be provided as well from the assistance interface 121 and/or the teller interface 142 (from the transaction proxy 141), such as customer name, transaction type, time of request, etc. So, should the teller want more details or when the teller is available for more details, the teller can use the tablet $130_O$ to acquire such details to personalize the assistance with the customer at the ATM 120.

In an embodiment, the request for assistance is manually made by the customer via a screen (request for assistance button) on a display of the ATM 120 (the screen responsive to the assistance interface 121. In another case, the assistance interface 121 determines based on elapsed time, repeated failed actions of the customer while conducting the financial transaction, and/or a resolved state of the financial transaction that a request for assistance should be automatically generated and raised by the assistance interface 121.

The monitor interface $131_O$ can also be used by a teller to communicate with other tellers and their tablets $130_N$ via instances of the monitor interface $131_N$. This is a wireless connection, via secure WiFi, within the bank branch 110 or via Peer-to-Peer (P2P) connections from tablet $130_O$ to tablet $130_N$. In this manner, the tellers can delegate, assign, and confirm who is handling a customer's request for assistance emanating from the ATM 120. This teller-to-teller (T2T) communication can also occur with the monitor interfaces $131_O$-$131_N$. Alternative, a separate interface on the tablets $130_O$-$130_N$ can be used for T2T communications (not shown in the architecture 100). In fact, a supervisor or delegated teller can assign requests for assistance from ATM customers (here each request for assistance is centrally sent to one tablet $130_O$ associated with the supervisor or delegating teller.

In an embodiment, the requests for assistance are broadcasted wirelessly to each tablet $131_O$-$131_N$ by the teller interface 142 and a particular teller selects it with the other tellers receiving a T2T communication from the accepting teller that a particular request was accepted by a particular teller. So, management of the requests for assistance can be done centrally or can be done in a decentralized manner by all the tellers acting cooperatively though T2T communications.

According to an embodiment, the teller interface 142 includes an automated load-balancing agent that either selects tellers to service a request for assistance based on a round-robin technique (using an ordered list of the tellers) or based on other metrics, such as line queues at each of the teller stations (captured and analyzed perhaps by sensors or cameras within the bank branch 110 (not shown in the architecture 100) and evaluated by the agent), experience of an agent (based on information associated with a particular request for assistance), and the like.

T2T communications can also be used by the tellers to ask questions and resolve issues, associated with the request for assistance, when the serving teller goes to assist the customer and has questions that the servicing teller knows another teller has an answer for. This also saves time and provides efficiency because the servicing teller does not have to leave the customer and locate the teller with an answer and the teller with an answer can still assist a customer at his/her teller station without too much of a distraction.

One now appreciates how bank staff can more efficiently service customers in person while acknowledging, in near real time, a customer in need of assistance at an ATM 120. This also improves the customers' experiences with the bank while at the bank branch 110 and improves the productivity of the tellers.

These (above-discussed) embodiments and other embodiments are now discussed with reference to the FIGS. 2-4.

Figure 2:
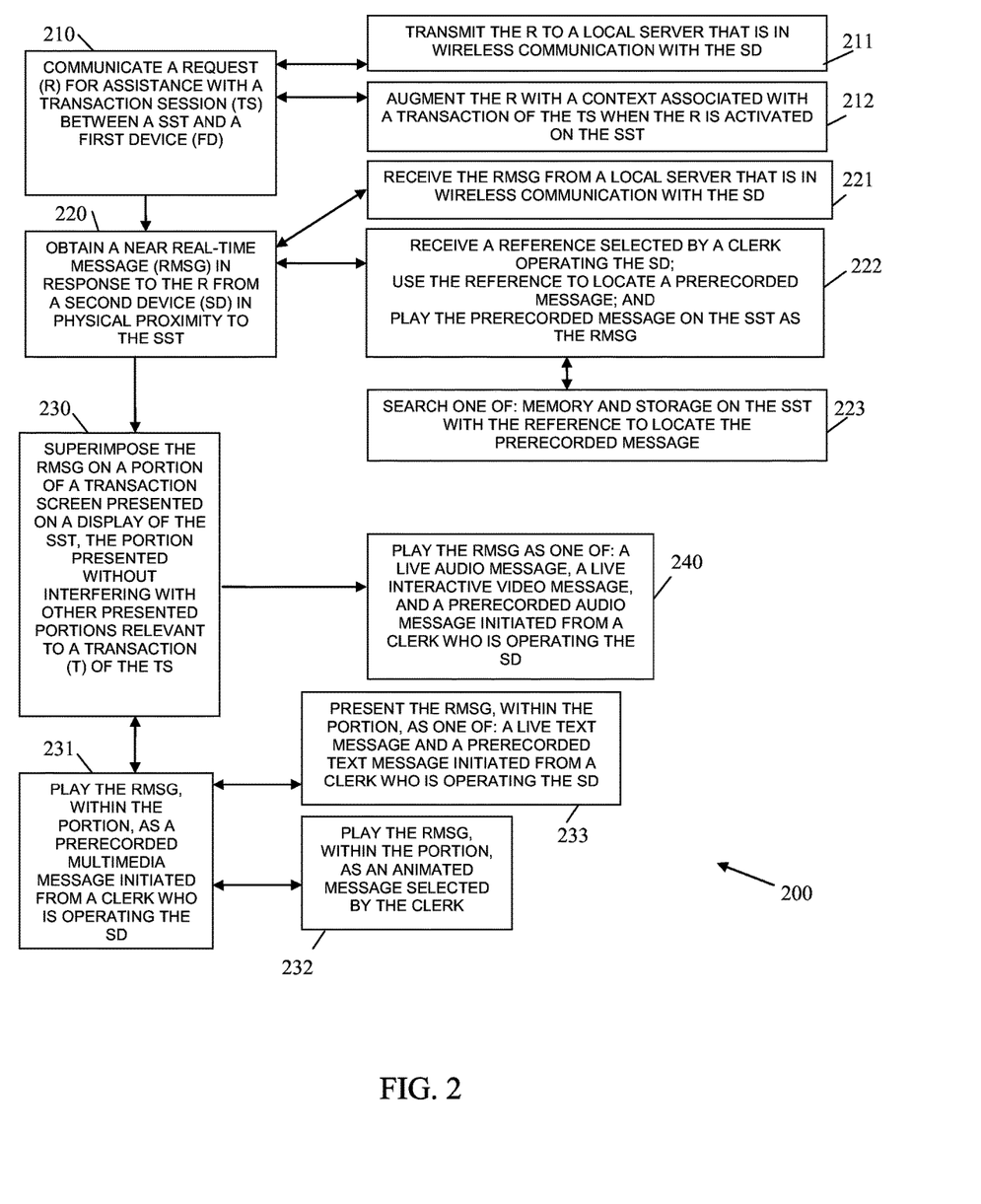
FIG. 2 is a diagram of a method for inter-device SST interactions, according to an example embodiment.

FIG. 2 is a diagram of a method 200 for inter-device SST interactions, according to an example embodiment. The software module(s) that implements the method 200 is referred to as a "SST-assistance manager." The SST-assistance manager is implemented as executable instructions programmed and residing within memory and/or a non-transitory computer-readable (processor-readable) storage medium and executed by one or more processors of a device. The processors of the device that executes the SST-assistance manager are specifically configured and programmed to process the SST-assistance manager. The SST-assistance manager has access to one or more networks during its processing. The networks can be wired, wireless, or a combination of wired and wireless.

In an embodiment, the device that processes the SST-assistance manager is the ATM 120 and the SST-assistance manager is the assistance interface 121 of the FIG. 1.

In another embodiment, the device that processes the SST-assistance manager is a kiosk situated on the premises of a retail establishment where customers can conduct self-service transactions at the kiosk and also conduct in-person transactions with a clerk of the establishment.

At 210, the SST-assistance manager communicates a request for assistance that is associated with a transaction session between a SST and a first device. The first device is a backend system that is servicing the transaction of a consumer who is interacting with the SST. The first device may be local or external to the establishment or facility where the SST is situated. The SST also executes the SST-assistance manager.

In an embodiment, the first device is the enterprise system 150 of the FIG. 1.

According to an embodiment, at 211, the SST-assistance manager transmits the request to a local server that is in wireless communication with a second device. The second device is a mobile device, such as one of the tablets $130_O$-$130_N$ of the FIG. 1. So, the SST (which processes the SST-assistance manager) indirectly communicates the request for assistance to the second device via a local server, such as local server 130 of the FIG. 1.

In an embodiment, at 212, the SST-assistance manager augments (adds or enhances) the request with a context associated with the transaction being performed by the consumer at the SST. This is done when the request is activated on the SST (such as by manual selection of the consumer or based on an event or condition automatically detected during the transaction and raised on behalf of the consumer from the SST). The context can include a variety of information relevant to the consumer (customer identifier, customer name, customer image, live customer video feed, loyalty level of the customer, etc.) and/or the transaction (transaction identifier, SST identifier, time, date, transaction type, etc.).

At 220, the SST-assistance manager obtains a near real-time message in response to the request for assistance from a second device, which is in physical proximity to the SST where the consumer is conducting a transaction. The second device operated by a clerk of the establishment where the SST resides and, in an embodiment, the second device is a mobile device.

In an embodiment, at 221, the SST-assistance manager receives the near real-time message from a local server, which is in wireless communication with the second device. This is similar to the embodiment of 211 only the response is being received through the local server and delivered to the SST-assistance manager on the SST.

According to an embodiment, at 222, the SST-assistance manager receives a reference selected by a clerk operating the second device; uses that reference to locate a prerecorded message from an operator of the second device (message can be personalized by the operator); and plays the prerecorded message on the SST as the near real-time message. This can be done in a screen of a display for the SST that does not interfere with other screens presented within the display and associated with the independent transaction of the consumer simultaneously occurring on the SST.

In an embodiment of 222 and at 223, the SST-assistance manager searches one of: memory and storage on the SST with the reference to locate the prerecorded message for playing on the SST.

In an embodiment, at 230, the SST-assistance manager superimposes the near real-time message on a portion of a transaction screen presented on a display of the SST. That portion presented without interfering with other presented portions, which are relevant to the transaction associated with the transaction session of the consumer at the SST.

In an embodiment of 230 and at 231, the SST-assistance manager plays the near real-time message within the portion of the screen as a prerecorded multimedia message initiated from a clerk who is operating the second device. In an embodiment, multimedia message is a prerecorded video message from the operator of the second device.

In an embodiment of 231 and at 232, the SST-assistance manager plays the near real-time message within the portion of the screen as an animated message selected by the clerk. For example, the animated message can be an avatar selected by the clerk that relays an audio-visual message to the consumer at the SST.

In another embodiment of 231 and at 233, the SST-assistance manager presents the near real-time message with the portion of the screen as one of: a live text message and a prerecorded text message initiated from a clerk who is operating the second device.

According to an embodiment, at 240, the SST-assistance manager plays the near real-time message as one of: a live audio message, a live-interactive video message, and a prerecorded audio message that is initiated by a clerk who is operating the second device.

Figure 3:
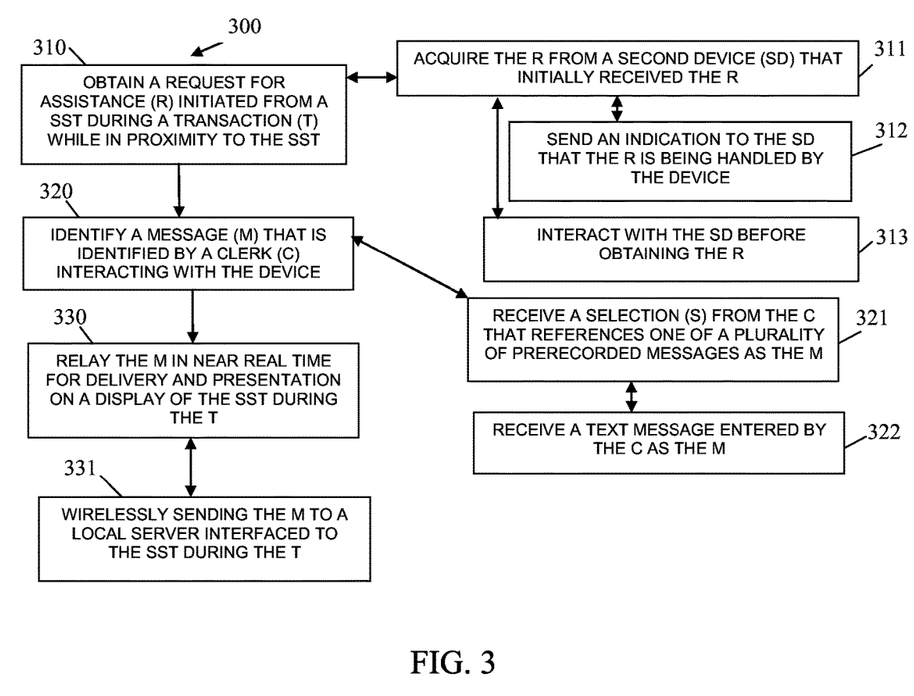
FIG. 3 is a diagram of another method for inter-device SST interactions, according to an example embodiment.

Processing associated with the second device of the clerk (the second device in physical proximity to the SST) is now presented with the description of the FIG. 3.

FIG. 3 is a diagram of another method 300 for inter-device SST interactions, according to an example embodiment. The software module(s) that implement the method 300 is referred to herein as a mobile-device assistance manager. The mobile-device assistance manager is implemented as executable instructions and programmed within memory and/or a non-transitory computer-readable (processor-readable) storage medium that executes on one or more processors of a mobile device, such as tablet $130_O$, a smart phone, a laptop, a wearable processing device (Google Glass®), etc. The processors of the mobile device are specifically configured to execute the mobile-device assistance manager. The mobile-device assistance manager can access one or more networks; the networks can be wired, wireless, or a combination of wired and wireless.

In an embodiment, the device that processes the mobile-device assistance manager (method process 300) is the tables $130_O$-$130_N$. In an embodiment, mobile-device assistance manager is implemented as an instance of the monitor interfaces $131_O$-$131_N$.

At 310, the mobile-device assistance manager obtains a request for assistance initiated from a SST during a transaction while in proximity to the SST. The request can be received directly or indirectly from the SST (such as through a local server 130 interfaced to the SST or through another operating instance of the mobile-device assistance manager processing on another mobile device and in communication with the mobile-device assistance manager).

For example, at 311, the mobile-device assistance manager acquires the request from a second device that initially received the request. The second device can include a different operating instance of the mobile-device assistance manager and may also be a mobile device that is being operated by a different clerk of the establishment where the SST is situated. The second device can be an intermediate server (as discussed above) or an intermediate control device that routes the request to the mobile-device assistance manager.

In an embodiment of 311 and at 312, the mobile-device assistance manager sends an indication to the second device that the request is being actively handled by the clerk operating the mobile device having the mobile-device assistance manager.

In another embodiment of 311 and at 313, the mobile-device assistance manager interacts with the second device before obtaining the request. That is, a clerk associated with the mobile-device assistance manager of the mobile device and a different clerk associated with a different instance of the mobile-device assistance manager of a different mobile device use an interface associated with the mobile-device assistance manager to interactively communicate about the request for efficient request resolution on behalf of the consumer at the SST.

At 320, the mobile-device assistance manager identifies a message that is identified by a clerk interacting with the mobile device. For example, a clerk-facing interface (such as monitor interface $131_O$) that is responsive to instructions of the mobile-device assistance manager receives a message or message reference from the clerk operating the mobile device.

In an embodiment, at 321, the mobile-device assistance manager receives a selection from the clerk that references one of a plurality of prerecorded messages as the message. This can be selected from a list of available prerecorded messages by the clerk using the clerk-facing interface of the mobile-device assistance manager.

In an embodiment of 321 and at 322, the mobile-device assistance manager receives a text messages entered by the clerk as the message. This is a live entered message provided to the clerk-facing interface by the clerk operating the mobile device.

At 330, the mobile-device assistance manager relays the message in near real-time for delivery and presentation on a display of the SST during the transaction of the consumer. Again, this can be done directly (mobile device to SST) or indirectly, such as through a local server that is in communication with the SST during the transaction.

In an embodiment, at 331, the mobile-device assistance manager wirelessly sends the message to a local server interfaced to the SST during the transaction (indirect relay, as discussed above).

Figure 4:
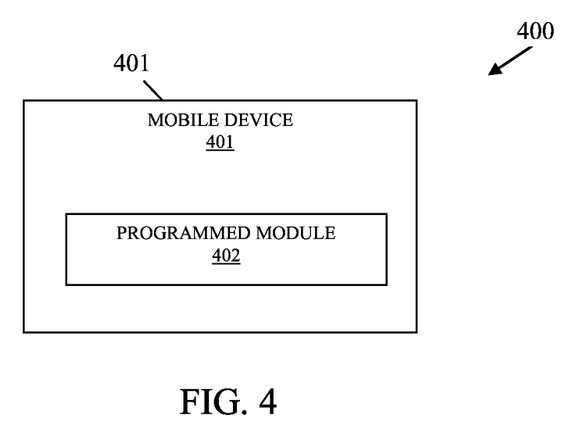
FIG. 4 is a diagram of an inter-device SST interaction system, according to an example embodiment.

FIG. 4 is a diagram of an inter-device SST interaction system 400, according to an example embodiment. The components of the inter-device SST interaction system 400 are programmed and reside within memory and/or a non-transitory computer-readable medium and execute on one or more processors of a mobile device. The inter-device SST interaction system 400 has access and can communicate over one or more networks; and the networks can be wired, wireless, or a combination of wired and wireless.

The inter-device SST interaction system 400 includes a mobile device 401 and programmed module 402 (software module or set of modules) that execute as executable instructions on one or more processes of a mobile device 401. The executable instructions reside in memory and/or a non-transitory computer-readable storage medium accessible to the mobile device 401.

In an embodiment, the programmed module 402 is an instance of one of the monitor interfaces $131_0$-$131_N$.

In an embodiment, the programmed module 402 is the method 300.

The mobile device 401 is programmed with the programmed module 402. The programmed module 402 is operable to monitor a plurality of SSTs in physical proximity to the mobile device 401 and operable to indicate an operator of the mobile device 401 when one of the monitored SSTs transmits a request for assistance. The programmed module 402 is also operable to provide the operator of the mobile device 401 with a plurality of prerecorded messages for selection by the operator and operable to relay to the SST that transmitted the request for assistance a prerecorded message selected by the operator.

According to an embodiment, the programmed module 402 is further operable to indicate to other mobile devices in proximity to the SSTs that the request has been accepted by the operator.

It should be appreciated that where software is described in a particular form (such as a component or module) this is merely to aid understanding and is not intended to limit how software that implements those functions may be architected or structured. For example, modules 141 and 142 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   providing, on a Self-Service Terminal (SST), a transaction interface for conducting a transaction initiated on the SST with a financial system;
   providing, on the SST, an assistance interface for obtaining assistance during the transaction;
   processing, by the transaction interface, the transaction with transaction details through a first connection between the SST and the financial system;
   communicating, by the assistance interface, an assistance request to a server through a second connection that is different from the first connection;
   broadcasting, by a teller interface of the server, the assistance request to a plurality of wireless devices by processing a secure wireless encryption protocol;
   obtaining, by the teller interface, a near real-time message from a particular wireless device that is in physical proximity to the SST responsive to the broadcasting;
   providing, by the assistance interface, a first portion of the transaction details from the transaction to the teller interface while a second portion of the transaction details remain hidden from the teller interface; and
   wirelessly providing, by the teller interface, the first portion of the transaction details to the particular wireless device.

2. The method of claim 1 further comprising, superimposing, by the assistance interface, the near real-time message onto a portion of a transaction screen presented on a display of the SST, the portion presented without interfering with other presented portions relevant to the transaction, wherein the transaction screen generated by the transaction interface and the real-time message generated by the assistance interface.

3. The method of claim 2 further comprising, playing the near real-time message, within the portion, as a prerecorded multimedia message initiated from a clerk who is operating the particular wireless device.

4. The method of claim 3, wherein playing further includes playing the near real-time message, within the portion, as an animated message selected by the clerk.

5. The method of claim 2 further comprising, presenting, by the assistance interface, the near-real time message, within the portion, as one of: a live text message and prerecorded text message initiated from a clerk who is operating the particular wireless device.

6. The method of claim 1 further comprising, playing, by the assistance interface, the near real-time message as one of: a live audio message, a live interactive video message, and a prerecord audio message initiated from a clerk who is operating the particular wireless device.

7. The method of claim 1, wherein communicating further includes augmenting the assistance request with a context associated with the transaction when the assistance request was identified on the SST by the assistance interface.

8. The method of claim 1, wherein obtaining further includes:
   receiving, by the assistance interface, a reference selected by a clerk operating the particular wireless device;
   using, by the assistance interface, the reference to locate a prerecorded message; and
   playing, by the assistance interface, the prerecorded message on the SST as the near-real time message.

9. The method of claim 8, wherein using further includes searching one of: memory and storage on the SST with the reference to locate the prerecorded message.

* * * * *